May 15, 1956 — R. L. PUCKETT — 2,745,933
STUD WELDER
Filed Sept. 9, 1953
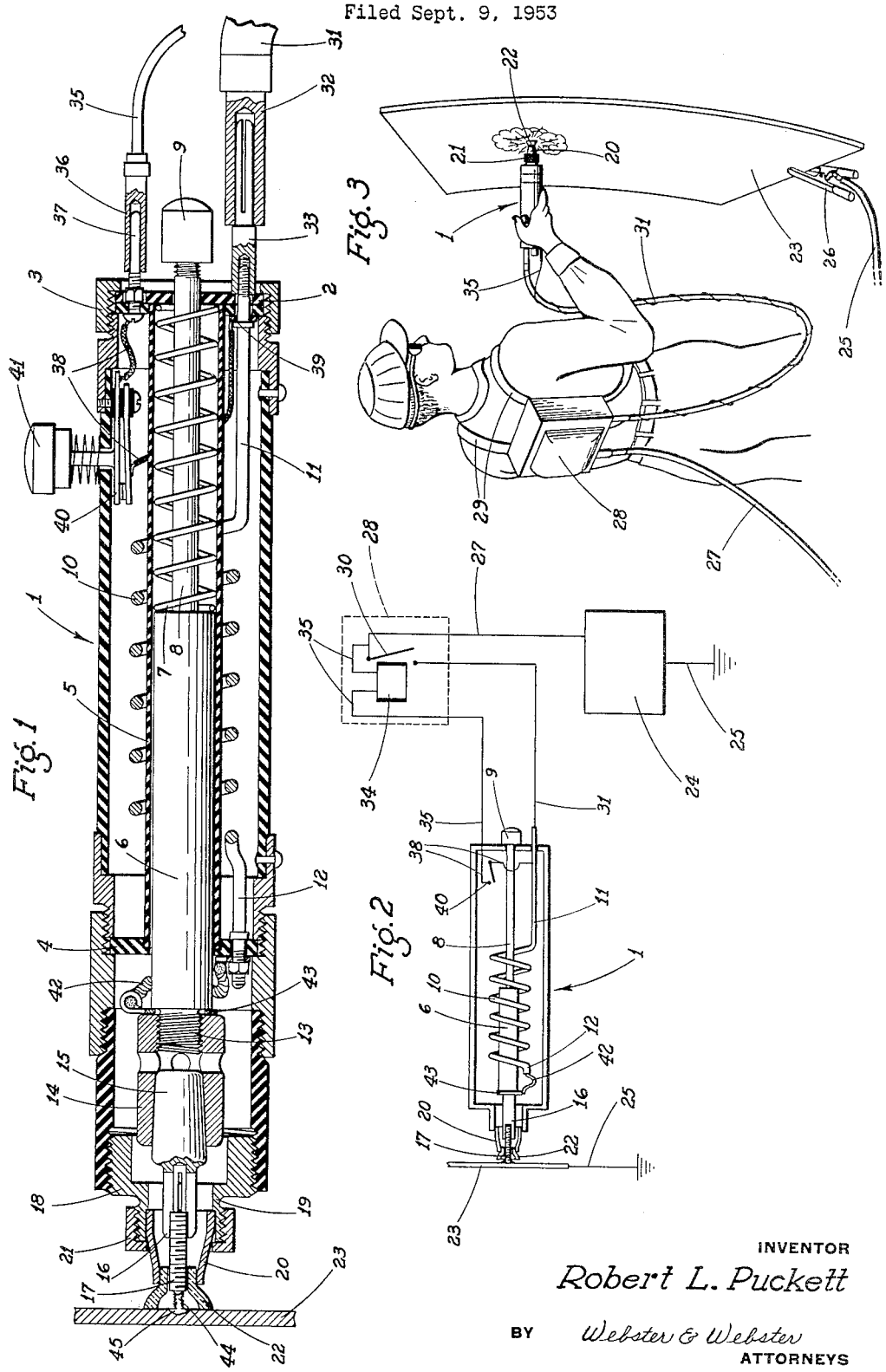
INVENTOR
Robert L. Puckett
BY Webster & Webster
ATTORNEYS United States Patent Office 2,745,933
Patented May 15, 1956

2,745,933

STUD WELDER

Robert L. Puckett, Stockton, Calif., assignor of one-half to Guntert & Zimmerman Const. Div., Inc., Stockton, Calif., a corporation of California Application September 9, 1953, Serial No. 379,273

1 Claim. (Cl. 219—4)

This invention is directed to, and it is a major object to provide, a novel manually supported device for end-welding a threaded metallic stud to a plate or the like in outwardly projecting relation; the purpose of so welding the stud being that it may subsequently receive a nut for holding another part in place on the plate.

Another important object of this invention is to provide a stud welder which includes, within a tubular body, a nomally spring-advanced plunger having a chuck on the forward end for releasable reception of a threaded stud in axially disposed, forwardly projecting relation; the chuck, which is interposed in the welding circuit, being retracted to draw an electric arc between the projecting stud and plate whereby a molten pool of metal is formed in the latter, and the chuck is then spring advanced to forcefully plunge the stud into said molten pool, which cools and welds said stud in place.

An additional object of this invention is to provide a stud welder, as above, wherein the plunger is included in a novel solenoid assembly; such solenoid assembly being enclosed within the tubular body and operative to retract the stud for the aforesaid purpose of drawing the arc between said stud and the plate.

A further object of the invention is to provide a stud welder, as in the preceding paragraph, which includes a novel control circuit for the solenoid assembly of the device; said solenoid assembly being interposed in, and energized from, the main welding circuit, and the latter having a relay switch therein responsive to closing of the control circuit by means of a push button on the device.

A separate object of the invention is to provide a stud welder of the type described which embodies a novel plunger-supported chuck unit for releasably supporting the stud in a forwardly projecting position.

It is also an object of the invention to provide a stud welder which is designed for ease and economy of manufacture; the device being relatively simple in structure, but positive in operation.

Still another object of the invention is to provide a practical and reliable stud welder, and one which will be exceedingly effective for the purpose for which it is designed.

These objects are accomplished by means of such structure and relative arrangement of parts as will fully appear by a perusal of the following specification and claim.

In the drawings:

Fig. 1 is a longitudinal sectional elevation of the device as in use; the plunger, together with the chuck unit and stud, being shown in retracted arc-drawing position.

Fig. 2 is a diagrammatic view of the device, together with the circuiting arrangement; the device being shown with the plunger in advanced stud welding position.

Fig. 3 is a perspective view showing an operator using the device.

Referring now more particularly to the drawings, and to the characters of reference marked thereon, the stud welder comprises an elongated tubular body indicated generally at 1; such body as shown being sectional, including sections of dielectric material secured together by suitable metallic fittings.

At its rear end the tubular body 1 is closed by a dielectric end disc 2 secured in place by a threaded-on, flanged end ring 3.

At the forward portion thereof, but short of its front end, the tubular body 1 is fitted, internally, with a dielectric disc 4, and a reduced-diameter guide sleeve 5 of dielectric material is supported axially in the tubular body 1 between the dielectric discs 2 and 4.

The dielectric guide sleeve 5 opens forwardly through the disc 4, and an elongated cylindrical solenoid plunger 6 is disposed in slidable relation in the guide sleeve 5, projecting at the forward end a short distance ahead of the disc 4. The plunger 6 is normally held in an advanced position by a helical compression spring 7 disposed between the rear end of said plunger 6 and the rear end disc 2; there being an axial guide rod 8 which extends rearwardly from the plunger 6 within the spring 7 and through a central opening in the rear end disc 2. The guide rod 8 projects rearwardly of said end disc 2 and is there fitted with an end 9 which serves as an adjustable stop to limit forward travel of the plunger 6 under the influence of the spring 7.

A heavy-duty solenoid coil 10 is helically wound about the guide sleeve 5, encompassing a substantial portion of the solenoid plunger 6; such coil 10 having a rear leg 11 which is secured to, and projects through, the rear end disc 2 and a front leg 12 which is secured to, and projects through, the disc 4.

At its forward end and ahead of the disc 4 the plunger 6 is formed with a threaded neck 13 onto which a taper socket chuck 14 is threaded; the taper socket of the chuck opening forwardly, and receives therein an enlarged tapered shank 15 of a forwardly projecting spring finger chuck 16. The spring finger chuck 16 is adapted to frictionally engage and support a threaded stud 17 in forwardly projecting relation; i. e. projecting a distance ahead of the forward end of the body 1.

An end plug 18 is adjustably threaded into the forward end portion of the body 1, and said plug is formed with an integral, forwardly projecting neck 19. A ferrule 20 is supported by the neck 19 and projects forwardly therefrom, such ferrule being held in place by a flanged securing ring 21.

The ferrule 20, which surrounds the supported stud 17 in clearance relation, provides the support for a necked, forwardly opening ceramic cup 22 adapted to abut against the metallic plate 23 to which the stud 17 is to be welded; the device when in use being manually supported in the position as shown in Fig. 3.

Adjustment of the end head 9, as well as adjustment of the end plug 18, accomplishes proper initial relative positioning of the stud 17 and ceramic cup 22; i. e., these parts being positioned so that they both initially abut the plate 23 when the device is held in the position of Fig. 3.

The circuiting arrangement for the above described device comprises the following:

The welding machine, which is conventional, is indicated diagrammatically at 24, and includes a ground lead 25 which is coupled to the plate 23 by the usual clamp 26.

The other and "hot" lead 27 extends from the welding machine 24 into a box 28 supported on the operator's back by means of a shoulder harness 29. Within the box 28 the lead 27 is connected to one side of a relay switch 30. The other side of said relay switch 30 is connected by a lead 31 to the rear leg 11 of the solenoid coil 10; such lead extending from the box 28 to the body 1, with ample length for manipulation of the latter. This connection is made by the use of a connector 32 on lead 31 removably engaged on a terminal pin 33 secured in connection with the rear leg 11 of coil 10, and projecting rearwardly from disc 2 in radially offset relation to the guide rod 8.

The relay switch 30, which is disposed in the box 28, is initially open, and includes a relay or switch closing coil 34. This relay coil is interposed in a control circuit which comprises a lead 35 which is connected across the relay switch 30 in parallel thereto; this being accomplished as follows:

At one end the lead 35, which extends from box 28 to the body 1 along the lead 31, is connected to the lead 27 ahead of the switch 30; said lead 35 at its other end including a connector 36 removably engaged on a terminal pin 37 which projects from the disc 2 in radially offset relation to the rod 8 opposite the terminal pin 33.

Within the tubular body 1 the lead 35 continues as a flexible wire 38 which leads at the opposite end to connection with the rear leg 11 of the solenoid coil 10, as at 39.

Within the tubular body 1 the flexible wire 38 has a normally open spring blade switch 40 inteposed therein; such switch being secured to the top side of the body 1 and is adapted to be closed by a spring retracted push button 41 disposed exteriorly of the body 1, but having a connection with one blade of said switch, as shown.

The front leg 12 of the solenoid coil 10 is connected by a flexible wire 42 to the chuck 14 by means which includes a washer 43 engaged between the rear end of said chuck 14 and the adjacent end of the plunger 6; the flexible wire 42 having sufficient play to permit of reciprocation of the plunger 6 without restriction.

In use of the above described stud welder, and with the welding machine 24 in operation, the operator grasps the device in the manner shown in Fig. 3 and disposes the ceramic cup 22 against the plate 23, and at which time the stud 17 likewise lies against such plate due to the fact that the plunger 6 is in its initially advanced position.

The operator then depresses the push button 41 and holds it in such position. This closes the control circuit, comprised of the lead 35 and wire 38, whereby relay coil 34 is energized from the main welding circuit, which includes lead 27 and lead 31. The load which the relay coil 34 imposes on the main welding circuit is not sufficient to energize the solenoid coil 10 or to cause any welding arc between the stud 17 and plate 23.

However, upon relay coil 34 being energized, relay switch 30 closes, which completes the welding circuit from lead 27 to lead 31, and thence through the coil 10 to the chuck unit and stud 17. Immediately upon closing of the main welding circuit, as above, the solenoid coil 10, due to its energization, causes retraction of the plunger 6, which pulls the stud 17 rearwardly away from the plate 23, drawing an electric arc 44, which immediately produces a molten pool 45 in the adjacent face of the plate 23. Thereafter, the operator releases the push button 41, whereupon the relay switch 30 opens, resulting in deenergization of the main welding circuit, including the solenoid coil 10. When this occurs the spring 7 forcefully slides the plunger 6 forwardly, plunging the stud 17 into the molten pool 45; the latter then cooling and effectively welding the stud 17 to the plate 23.

In addition to serving as an initial locator the ceramic cup 22 prevents molten metal splatter, which might otherwise endanger the operator.

With the described device a threaded stud may be effectively and positively end-welded to a metal plate or the like with facility and rapidity; all by the simple manipulation of the hand supported device in the manner described.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claim.

Having thus described the invention the following is claimed as new and useful, and upon which Letters Patent are desired:

A stud welder, for use with a welding machine having a main lead, comprising a tubular body, a plunger supported in the body for reciprocation axially thereof, a spring in the body urging the plunger forward, a chuck on the forward end of the plunger adapted to releasably support a stud projecting axially from the corresponding end of the body, manually controlled means in the body operative to retract the plunger and then release it for forceful advance by the spring, and means connecting the chuck in circuit with said main lead without restricting reciprocation of the plunger, a rear-end closure disc in the body, a guide rod extending axially rearwardly from the plunger and slidably extending through the disc, and an adjustable stop head on the rod exteriorly of said disc; the spring being of helical compression type and surrounding the rod between the plunger and disc.

References Cited in the file of this patent

UNITED STATES PATENTS

| | | |
|---|---|---|
| 2,217,964 | Nelson | Oct. 15, 1940 |
| 2,305,206 | Strobel | Dec. 15, 1942 |
| 2,342,144 | Hughes | Feb. 22, 1944 |
| 2,439,830 | Varela | Apr. 20, 1948 |
| 2,462,882 | Martin | Mar. 1, 1949 |
| 2,473,871 | Edels | June 21, 1949 |
| 2,474,531 | Keir | June 28, 1949 |
| 2,491,479 | Dash | Dec. 20, 1949 |
| 2,510,620 | Craven | June 6, 1950 |
| 2,640,133 | Ainsworth | May 26, 1953 |